US007006451B2

(12) United States Patent
Kuwahara

(10) Patent No.: US 7,006,451 B2
(45) Date of Patent: Feb. 28, 2006

(54) METHOD AND APPARATUS FOR PERFORMING WIRELESS COMMUNICATION USING A PLURALITY OF FREQUENCY CHANNELS

(75) Inventor: Kazuyoshi Kuwahara, Fussa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 810 days.

(21) Appl. No.: 10/026,884

(22) Filed: Dec. 27, 2001

(65) Prior Publication Data

US 2002/0080739 A1 Jun. 27, 2002

(30) Foreign Application Priority Data

Dec. 27, 2000 (JP) ............................. 2000-398856

(51) Int. Cl.
   H04J 1/00 (2006.01)
   H04Q 7/00 (2006.01)
(52) U.S. Cl. .................. 370/252; 370/333; 370/343; 375/132; 455/62; 455/63.3; 455/450
(58) Field of Classification Search ............... 370/252, 370/319, 328, 329, 331, 332, 333, 343, 344; 375/130, 132, 133; 455/450, 452.1, 452.2, 455/509, 62, 63.1, 63.3; 714/704, 707
See application file for complete search history.

(56) References Cited

U.S. PATENT DOCUMENTS

| 5,036,515 | A | * | 7/1991 | Freeburg ..................... 714/708 |
| 5,699,365 | A | * | 12/1997 | Klayman et al. ............ 714/708 |
| 5,898,928 | A | * | 4/1999 | Karlsson et al. ............. 455/450 |
| 5,937,002 | A | | 8/1999 | Andersson et al. .......... 375/202 |
| 6,130,905 | A | | 10/2000 | Wakayama ................. 375/132 |
| 6,195,327 | B1 | * | 2/2001 | Lysejko et al. .............. 370/201 |
| 6,240,126 | B1 | * | 5/2001 | Ohashi et al. ............... 375/132 |
| 6,272,353 | B1 | | 8/2001 | Dicker et al. ................ 455/517 |
| 6,385,773 | B1 | * | 5/2002 | Schwartzman et al. ...... 725/124 |
| 6,493,331 | B1 | * | 12/2002 | Walton et al. ............... 370/341 |
| 6,614,770 | B1 | * | 9/2003 | Kayama et al. ............. 370/331 |
| 6,625,776 | B1 | * | 9/2003 | Wright et al. ................ 714/774 |
| 6,697,378 | B1 | * | 2/2004 | Patel ........................... 370/468 |
| 6,700,875 | B1 | * | 3/2004 | Schroeder et al. .......... 370/252 |
| 6,714,524 | B1 | * | 3/2004 | Kim et al. .................... 370/335 |
| 2002/0003792 | A1 | * | 1/2002 | Schmidl et al. ............. 370/343 |

FOREIGN PATENT DOCUMENTS

| EP | 1 039 655 A2 | 9/2000 |
| EP | 1 119 112 A2 | 7/2001 |
| GB | 2 261 141 A | 5/1993 |
| JP | 7-107010 | 4/1995 |
| JP | 7-147553 | 6/1995 |
| JP | 8-163091 | 6/1996 |
| JP | 9-186631 | 7/1997 |
| JP | 10-93479 | 4/1998 |
| JP | 10-98415 | 4/1998 |
| JP | 10-98416 | 4/1998 |
| JP | P3080903 | 6/2000 |

* cited by examiner

Primary Examiner—Alpus H. Hsu
(74) Attorney, Agent, or Firm—Finnegan, Henderson, Farabow, Garrett & Dunner, L.L.P.

(57) ABSTRACT

A wireless communication apparatus performs wireless communication using a plurality of frequency channels. In order to prevent a radio signal from interfering with another wireless communication system, the apparatus includes a unit which detects an error rate of each of the plurality of frequency channels, a unit which determines whether the detected error rate is higher than a specific threshold value, and a unit which suspends use of a frequency channel whose error rate is determined to be higher than the threshold value.

7 Claims, 10 Drawing Sheets

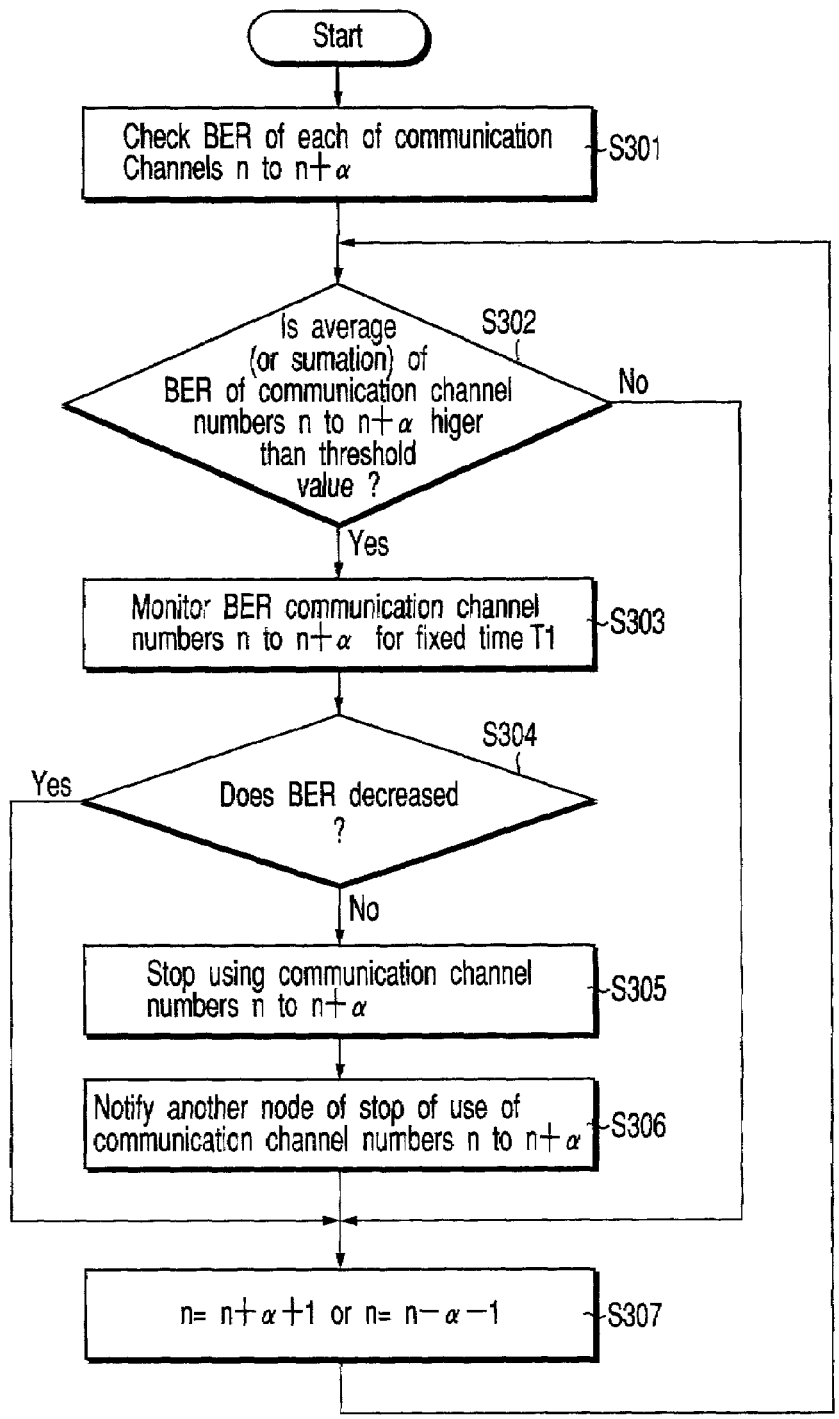
F I G. 14

METHOD AND APPARATUS FOR PERFORMING WIRELESS COMMUNICATION USING A PLURALITY OF FREQUENCY CHANNELS

CROSS-REFERENCE TO RELATED APPLICATIONS

This application is based upon and claims the benefit of priority from the prior Japanese Patent Application No. 2000-398856, filed Dec. 27, 2000, the entire contents of which are incorporated herein by reference.

BACKGROUND OF THE INVENTION

1. Field of the Invention

The present invention relates to a method and an apparatus for performing wireless communication using a plurality of frequency channels. More specifically, the invention relates to a method and an apparatus for performing wireless communication, which are applied to a short-range wireless communication system.

2. Description of the Related Art

A new short-range radio communication system for wirelessly connecting electronic apparatuses by radio signals has recently been developed. IEEE 802.11b and Bluetooth™ are known as typical short-range wireless communication systems.

IEEE 802.11b is a standard of a short-range wireless communication system targeted for a wireless LAN, while Bluetooth™ is a standard of a short-range wireless communication system targeted for wireless communication between various pieces of mobile and digital equipment. In either of the above wireless communication systems, a plurality of frequency channels are defined within a 2.4-GHz frequency band called an ISM (Industrial, Scientific and Medical) band, and these frequency channels are used selectively.

If, however, wireless communication using IEEE 802.11b and wireless communication using Bluetooth™ are carried out in the same area, there is a risk that interference of electromagnetic signals will occur between them. This interference decreases the wireless communication performance of the both IEEE 802.11b and Bluetooth™. Especially, the interference greatly influences the wireless communication performance of IEEE 802.11b. The wireless communication performance of IEEE 802.11b is therefore decreased significantly. Moreover, there is a case where disconnection of a radio link disables the wireless communication of IEEE 802.11b.

BRIEF SUMMARY OF THE INVENTION

An object of the present invention is to provide a wireless communication method and a wireless communication apparatus capable of preventing interference from occurring between different wireless communication systems using the same frequency band.

According to one aspect of the present invention, there is provided a method for performing wireless communication using a plurality of frequency channels, the method comprising; detecting an error rate of each of a plurality of frequency channels used by wireless communication; determining whether the detected error rate is higher than a specific threshold value; and suspending use of a frequency channel whose error rate is determined to be higher than the specific threshold value.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 14 is a flowchart of another channel select control process performed in the system shown in FIG. 1.

DETAILED DESCRIPTION OF THE INVENTION

Figure 1:
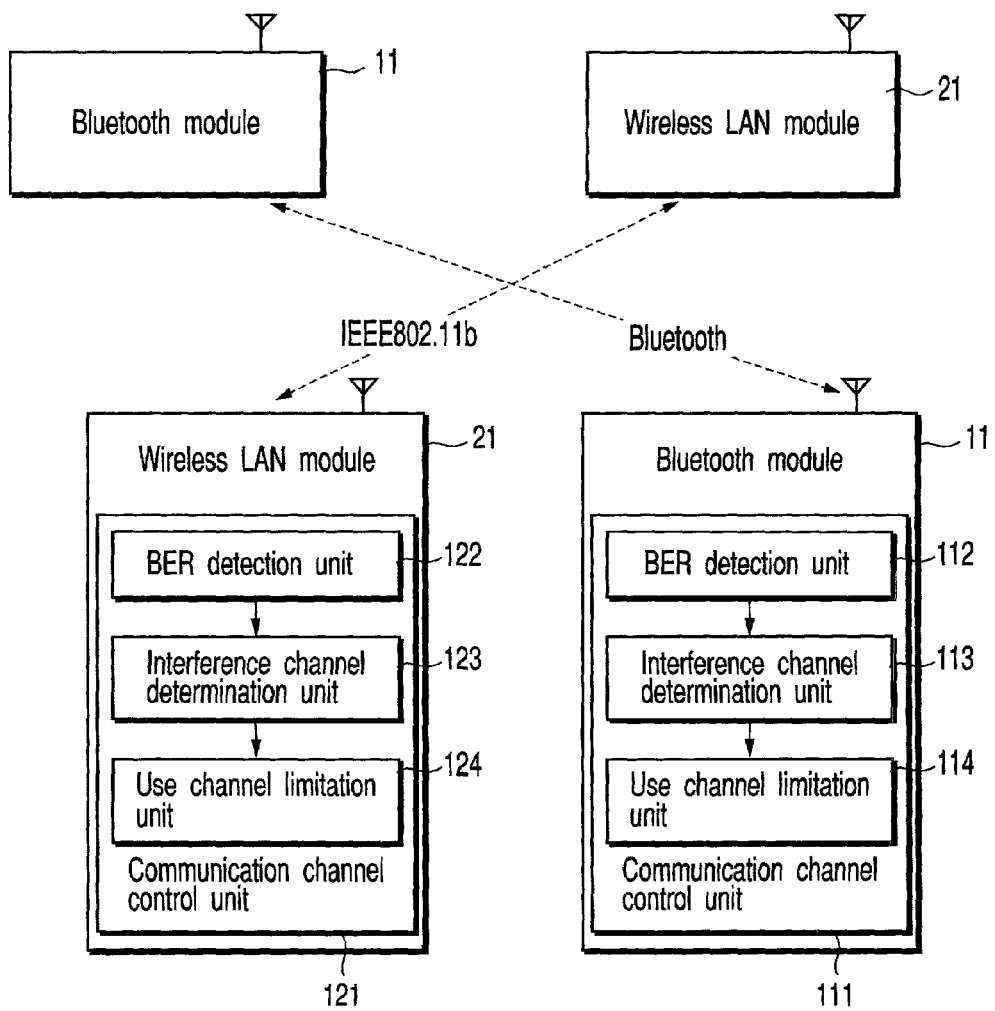
FIG. 1 is a block diagram showing a configuration of a radio communication system according to an embodiment of the present invention.

An embodiment of the present invention will now be described with reference to the accompanying drawings. FIG. 1 shows a configuration of a wireless communication system to which a wireless communication method according to the embodiment of the present invention is applied. The wireless communication method is used to prevent interference of radio signals from occurring among a plurality of wireless communication systems using the same frequency band. In the present embodiment, IEEE 802.11b and Bluetooth™ are exemplified as the wireless communication systems. In either of the systems, a plurality of frequency channels are defied within a 2.4-GHz frequency band called an ISM (Industrial, Scientific and Medical) band, and these frequency channels are used selectively.

A Bluetooth™ module 11 is a wireless communication device that conducts wireless communication based on the Bluetooth™ standard. The wireless communication system of the Bluetooth™ standard employs spread spectrum-frequency hopping (SS-FH) that transmits signals while varying their carrier frequencies at regular time intervals. 79 frequency channels are assigned to a 2.4-GHz frequency band at intervals of 1 MHz. The frequency channels (referred to as communication channels hereinafter), which serve as carrier frequencies, are selectively used on a time-division basis for each time slot based on a pseudo-noise code indicating a hopping pattern (frequency hopping). That is, the spread spectrum-frequency hopping (SS-FH) is a spread spectrum communication technique in which the frequency of a carrier is changed pseudo-randomly.

The wireless communication of the Bluetooth™ standard is achieved by a master-slave system, and a master manages the hopping patterns to be used. Using the same hopping pattern, a wireless network called Piconet can be organized between one master and seven slaves at the maximum.

A wireless LAN module 21 is a wireless communication device, which conducts wireless communication based on the IEEE 802.11b standard. Spread spectrum-direct sequence (SS-DS) is used in the wireless communication system of the IEEE 802.11b standard. 14 frequency channels (referred to as communication channels hereinafter) are assigned to a frequency band of 2.4 GHz at intervals of about 5 MHz. One or more selected communication channels can be used. A carrier having a carrier frequency that is the same as the central frequency of a selected communication channel is primary-modulated by an information signal and then secondary-modulated (spread-modulated) by a pseudo-noise code (spread code). The wireless network includes an ad hoc network for performing a peer-to-peer communication between stations in an area called a BSA (basic service area) and an infrastructure network for performing one-to-many communications among stations through an access point. In order to avoid a collision of signals occurring on the wireless network, a collision avoidance function called CSMA/CA (carrier sense multiple access with collision avoidance) is used.

In the present embodiment, the Bluetooth™ module 11 and the wireless LAN module 21 include communication channel control unit 111 and 112 respectively, in order to prevent interference of radio signals from occurring between IEEE 802.11b and Bluetooth™ using the same radio frequency band.

Bluetooth™ Module

The communication channel control unit 111 detects a communication channel (interference channel) that interferes with another wireless communication system such as IEEE 802.11b in the communication channels used by the Bluetooth™ module 11 and stops or suspends using the detected communication channel (releases the interference channel to another wireless communication system). The communication channel control unit 111 includes a bit error rate (BER) detection unit 112, an interference channel determination unit 113, and a use channel limitation unit 114, as shown in FIG. 1.

The BER detection unit 112 monitors a data error rate of each of communication channels used by the Bluetooth™ module 11 in order to evaluate the communication performance of each of the communication channels. The data error rate (which is sometimes referred to as an information error rate or simply as an error rate) is an index for evaluating the communication performance, which is represented as a BER (bit error rate), a packet error rate, an S/N ratio, etc. Hereinafter the BER is used as the data error rate. In Bluetooth™, basically, all of 79 communication channels are used selectively for each time slot. The BER detection unit 112 therefore monitors a BER for each of all the communication channels.

The interference channel determination unit 113 determines whether a communication channel interferes with another wireless communication system such as IEEE 802.11b based on the BER of the communication channel detected by the BER detection unit 112. When the BER of a communication channel is higher than a specific threshold value for a fixed period of time, the unit 113 determines that the communication channel interferes with another wireless communication system.

The use channel limitation unit 114 performs control to stop or suspend using a communication channel of the 79 communication channels of Bluetooth™, which is determined as an interference channel by the interference channel determination unit 113. The communication channel that is determined as an interference channel is omitted from the communication channels targeted for frequency hopping. The frequency hopping is therefore performed among the communication channels other than the interference channel.

In Bluetooth™, a master primarily performs all the communication control including management of a hopping pattern. Accordingly, only the master performs the above-described processes of monitoring a BER and determining an interference channel. The master has only to notify the slaves of the stop of use of a communication channel determined as an interference channel.

The Bluetooth™ module 11 is usually configured as a one-chip LSI or a two-chip LSI including an RF unit, a baseband unit, and a storage unit that stores firmware (containing protocol stack) for controlling the RF and baseband units. Since a protocol stack of the baseband unit performs the control for frequency hopping, the function of the above communication channel control unit 111 can be incorporated into the protocol stack of the baseband unit. Furthermore, a BER detecting function can be incorporated into an L2CAP (logical link control and adaptation protocol) for assembling and disassembling a packet. In the L2CAP, whenever each packet is received, its BER is detected as a BER of a current communication channel used for receiving the packet. A BER of a communication channel can also be detected, in accordance with a response packet from a destination node. The response packet indicates whether the sending packet transmitted by using a communication channel is normally received at the destination node.

Wireless LAN Module

The wireless LAN module 21 includes a communication channel control unit 121. The unit 121 detects a communication channel (interference channel) that interferes with another wireless communication system such as Bluetooth™ in the communication channels used by the wireless LAN module 21 and stops or suspends using the detected communication channel (releases the interference channel to another wireless communication system). The communication channel control unit 121 includes a bit error rate (BER) detection unit 122, an interference channel determination unit 123, and a use channel limitation unit 124, as shown in FIG. 1.

The BER detection unit 122 monitors a BER of each of communication channels used by the wireless LAN module 21 in order to evaluate the communication performance of each of the communication channels. In IEEE 802.11b, basically, one or more communication channels selected from among 14 communication channels can be used. The BER detection unit 122 therefore monitors a BER for each communication channel in use.

The interference channel determination unit 123 determines whether a communication channel interferes with another wireless communication system such as Bluetooth™ based on the BER of the communication channel detected by the BER detection unit 122. When the BER of a communication channel is higher than a specific threshold value for a fixed period of time, the unit 123 determines that the communication channel interferes with another wireless communication system.

The use channel limitation unit 124 is designed to stop or suspend using a communication channel, which is determined as an interference channel by the interference channel determination unit 123. For example, the unit 124 switches an interference channel to a communication channel other than the interference channel. When two or more communication channels are used for certain communication, one of them that is determined as an interference channel can be stopped or suspended and only the other can be used to continue the communication.

Like the Bluetooth™ module 11, a small-sized device incorporating firmware can achieve the wireless LAN module 21. Thus, the function of the communication channel control unit 121 has only to be contained in the firmware.

Channel Select Control

The principle of a channel select control operation for preventing an interference channel from occurring will now be described.

Figure 2:
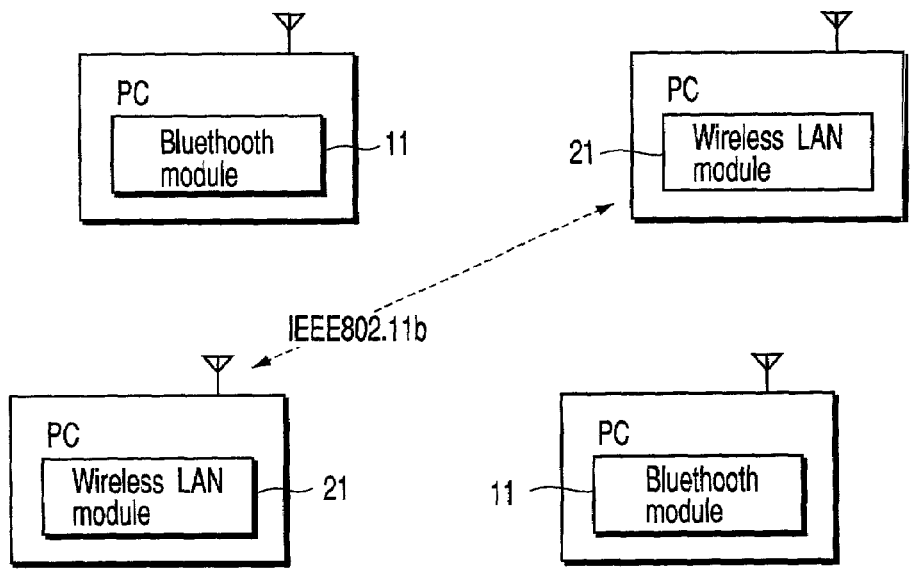
FIG. 2 is a block diagram of communications performed in a single radio communication mode in the system shown in FIG. 1.

1. Performing communication in a single wireless communication mode (FIGS. 2 and 3):

FIG. 2 shows a state in which only wireless communication of IEEE 802.11b is performed in a certain area. Referring to FIG. 2, a plurality of personal computers serving as electronic equipment mounted with the Bluetooth™ modules 11 and a plurality of personal computers serving as electronic equipment mounted with the wireless LAN modules 21 are present in the same area such as one room in an office. The foregoing ad hoc network or infrastructure network is constructed between the wireless LAN modules 21. Radio communication is conducted between nodes in the networks in accordance with the protocol of IEEE 802.11b. No radio communication is done between nodes mounted with the Bluetooth™ modules 11.

Figure 3:
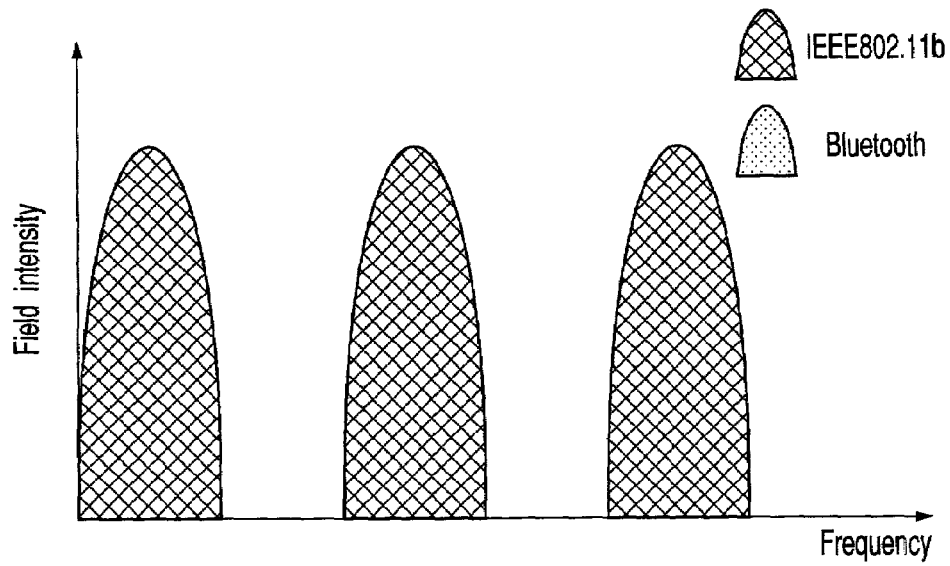
FIG. 3 is a graph of use states of frequencies in the communications shown in FIG. 2.

In this case, the ISM band is used only in the wireless communication system of IEEE 802.11b as shown in FIG. 3. FIG. 3 shows a case where three communication channels are used simultaneously by IEEE 802.11b. When such a single wireless communication system is used, no influence is exerted upon a bit error rate (BER) or an effective communication speed.

Figure 4:
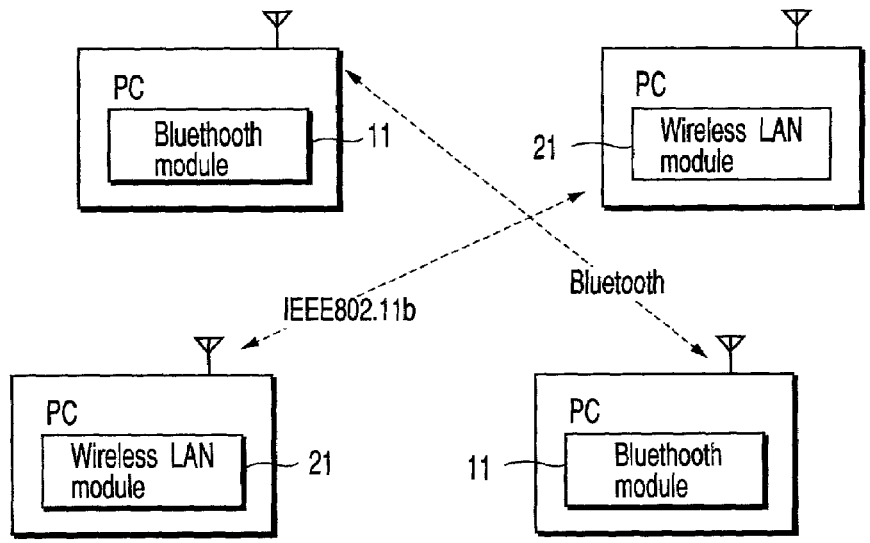
FIG. 4 is a block diagram of communications performed in a plurality of radio communication modes in the system shown in FIG. 1.
Figure 5:
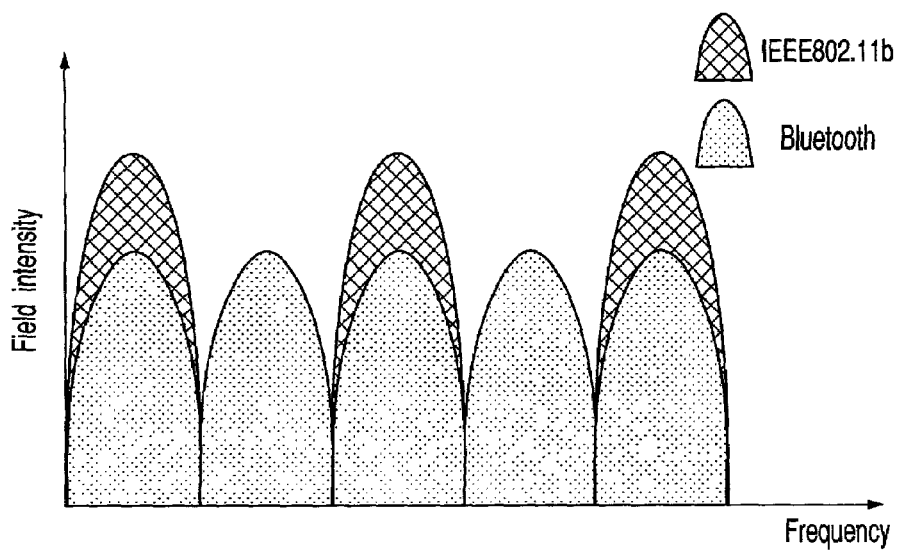
FIG. 5 is a graph of use states of frequencies in the communications shown in FIG. 4.

2. Simultaneously using a plurality of wireless communication modes of the same frequency band (FIGS. 4 and 5):

When wireless communication starts between Bluetooth™ modules 11 as illustrated in FIG. 4, radio signals of two different wireless communication systems using the same frequency band are mixed as illustrated in FIG. 5. In a communication channel on which interference occurs, a BER increases in both IEEE 802.11b and Bluetooth™, with the result that the number of times of retransmission control increases, the effective communication speed lowers, and at worst a radio link is disconnected.

Figure 6:
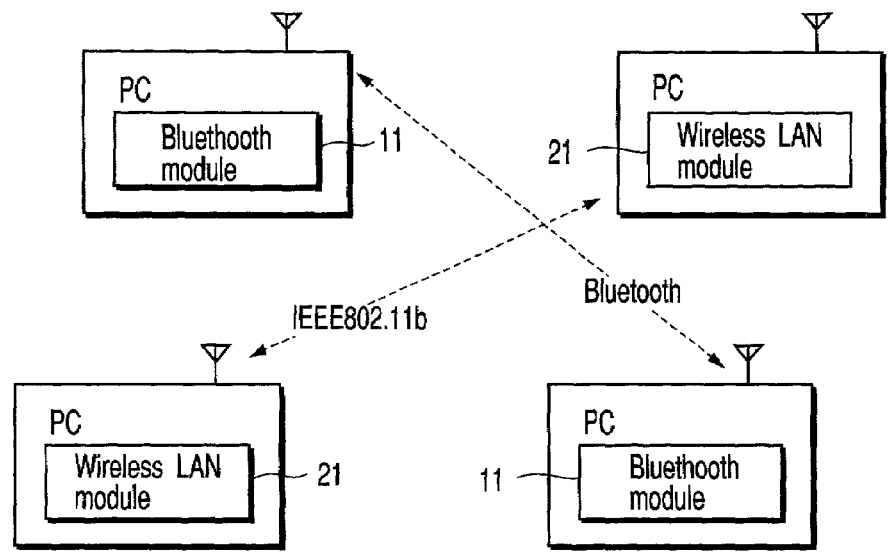
FIG. 6 is a block diagram of communications performed by selectively using communication channels in a plurality of radio communication modes in the system shown in FIG. 1.

3. Selectively using communication channels (FIGS. 6 and 7):

In the present embodiment, the Bluetooth™ module 11 performs wireless communication according to the protocol of the Bluetooth™ standard and simultaneously determines whether each of communication channels in use for the radio communication interferes with another communication system (IEEE 802.11b). If the module 11 determines a communication channel as an interference channel, it stops using the interference channel. The wireless LAN module 21 also performs wireless communication according to the protocol of the IEEE 802.11b standard and simultaneously determines whether each of communication channels in use for the radio communication interferes with another communication system (Bluetooth™). If the module 21 determines a communication channel as an interference channel, it stops using the interference channel.

For example, the wireless LAN module of IEEE 802.11b, which starts communication first, determines whether each of communication channels in use is an interference channels in order of decreasing frequency. If the module determines a communication channel as an interference channel, it stops using the interference channel. The Bluetooth™ module, which starts communication afterward, determines whether each of communication channels in use is an interference channels in order of increasing frequency. If the module determines a communication channel as an interference channel, it stops using the interference channel.

Since the interfering channel is excluded by selectively using the communication channels according to the communication systems of IEEE 802.11b and Bluetooth™ (see FIG. 7), it is possible to resolve the problem that one of IEEE 802.11b and Bluetooth™ cannot be used for communication or the effective communication speed of one of them is extremely decreased. Especially in Bluetooth™, some of communication channels targeted for hopping are simply reduced even though the use of the interference channel is stopped, so that an influence upon the effective communication speed can be lessened. Furthermore, the reduction of communication channels targeted for hopping allows the BER of the communication channels of IEEE 802.11b to be decreased in a band where the communication channels of Bluetooth™ are not used.

Figure 7:
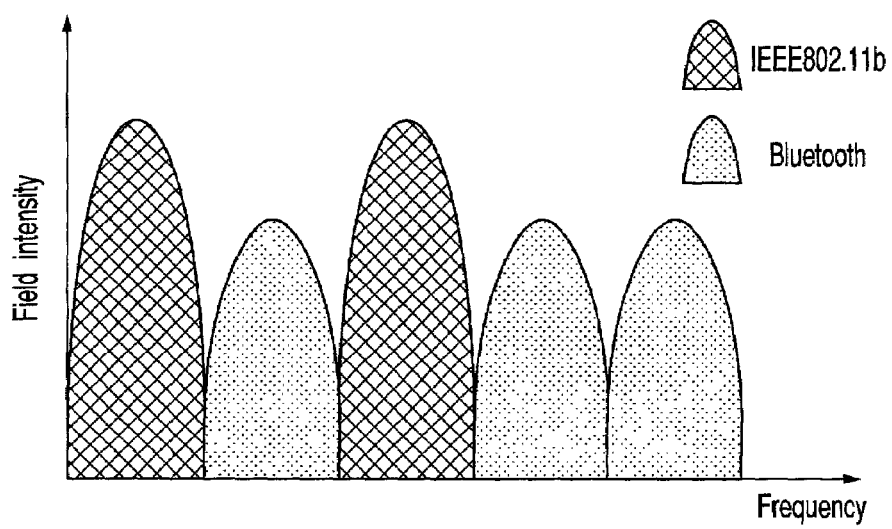
FIG. 7 is a graph of use states of frequencies in the communications shown in FIG. 6.
Figure 8:
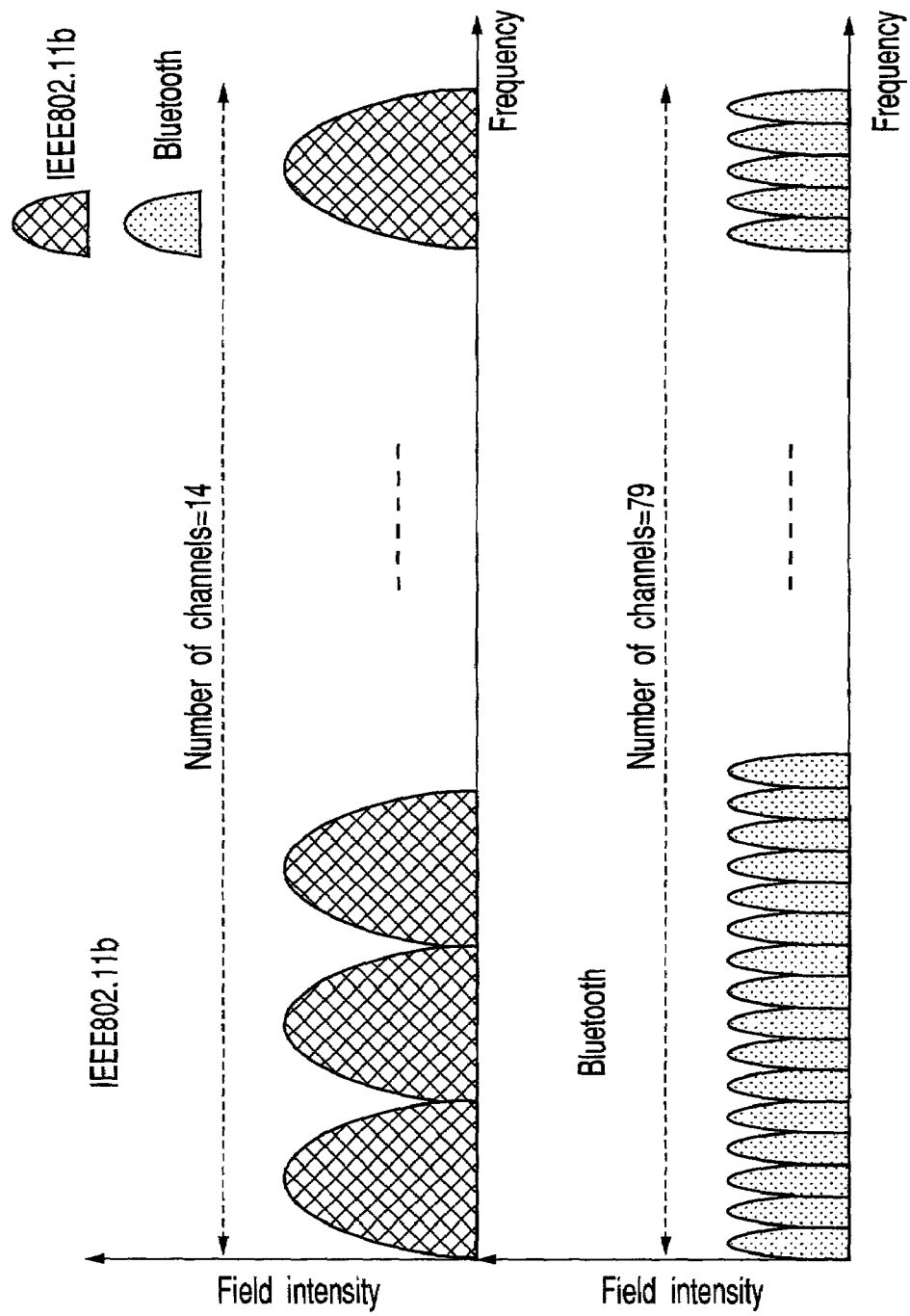
FIG. 8 is a graph explaining a communication channel of each of a plurality of radio communication modes used in the system shown in FIG. 1.

In FIGS. 3, 5 and 7, Bluetooth™ and IEEE 802.11b are shown to have the same communication channel width for simple description. Actually, as shown in FIG. 8, 79 communication channels are defined at intervals of 1 MHz within the ISM band in Bluetooth™, while 14 communication channels are defined within the ISM band in IEEE 802.11b. The bandwidth of one communication channel of IEEE 802.11b is 22 MHz (±11 MHz from the central frequency). In other words, continuous, at most, 22 communication channels of Bluetooth™ interfere with one communication channel of IEEE 802.11b.

Figure 9:
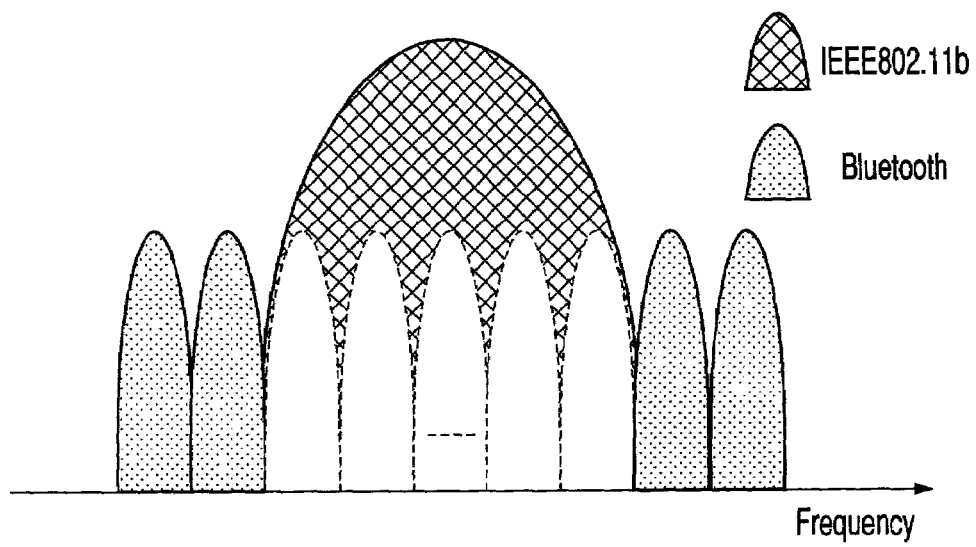
FIG. 9 is a diagram showing avoidance of channel interference in the system shown in FIG. 1.
Figure 10:
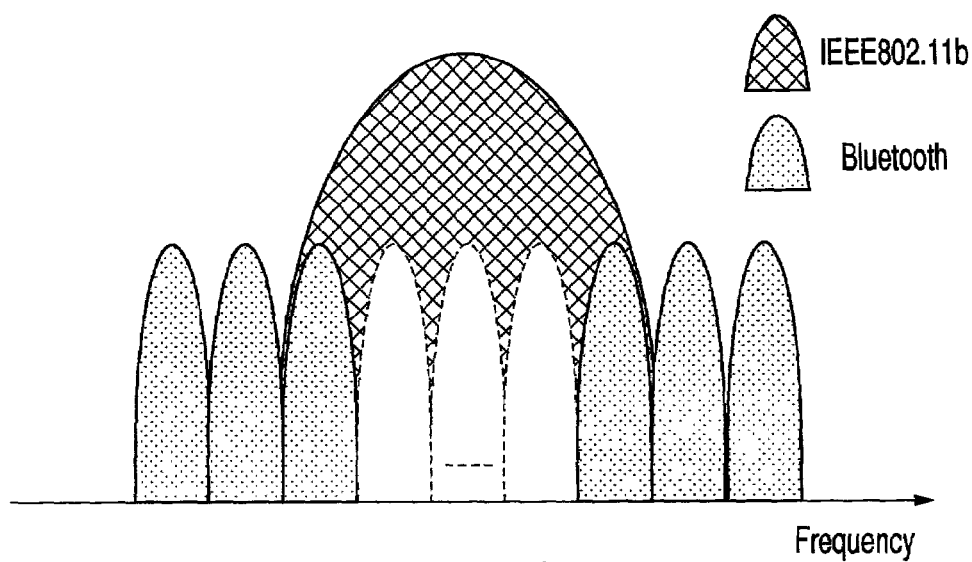
FIG. 10 is a diagram showing avoidance of channel interference in the system shown in FIG. 1.

When the use of an interfering channel is stopped on the Bluetooth™ side, the use of 22 communication channels of Bluetooth™ that overlap those of IEEE 802.11b is stopped as indicated by broken lines in FIG. 9. It is needless to say that not all of 22 communication channels of Bluetooth™ that overlap a communication channel of IEEE 802.11b increase in BER. As shown in FIG. 10, actually, the present embodiment will be satisfied if the use of only communication channels of the 22 communication channels of Bluetooth™, the BER of which exceeds a fixed value, is stopped.

Process of Channel Select Control

Figure 11:
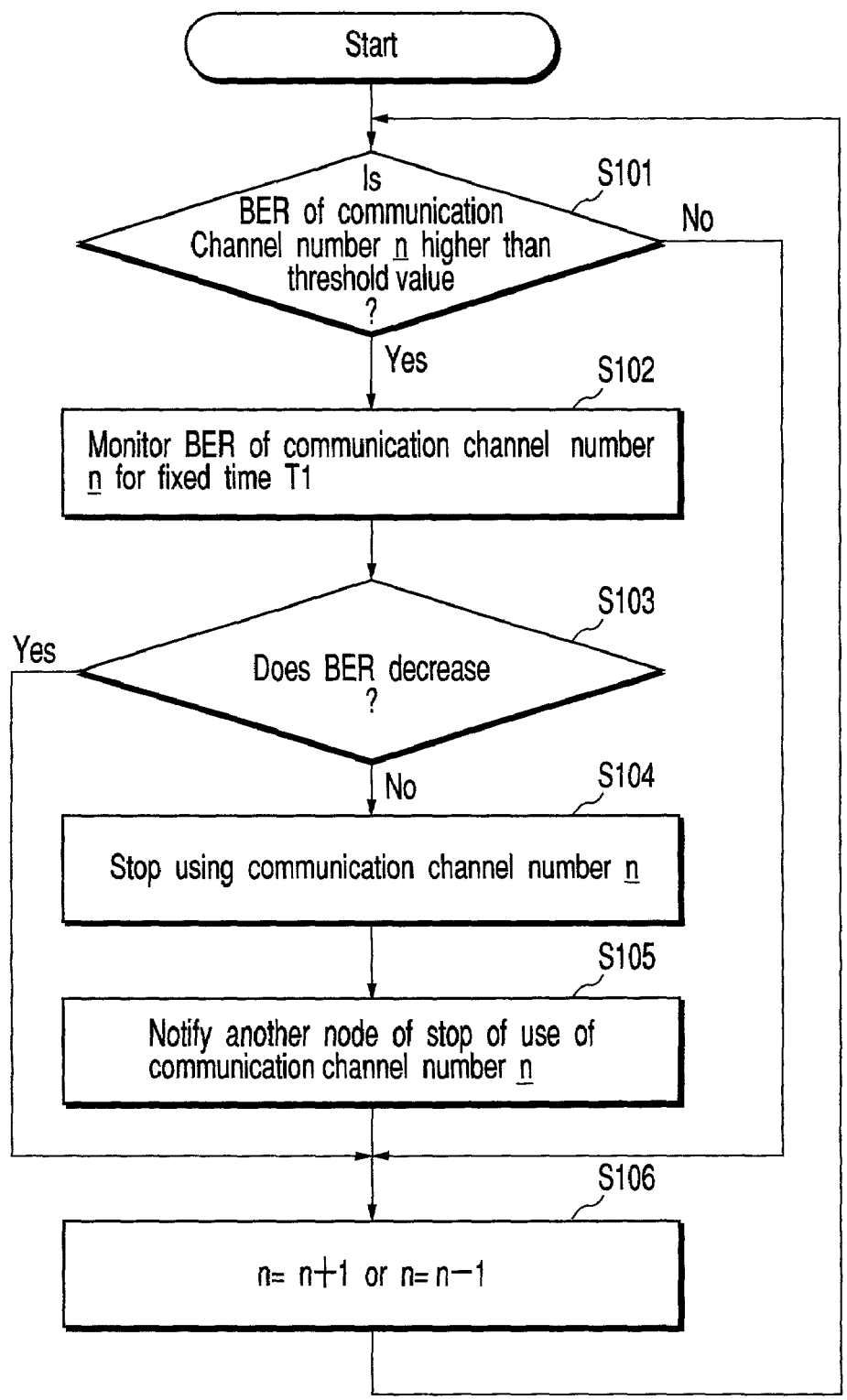
FIG. 11 is a flowchart of a channel select control process performed in the system shown in FIG. 1.

One example of a specific process of channel select control performed by each of the communication channel control units 111 and 121 will now be described with reference to the flowchart of FIG. 11.

First, the communication channel control unit checks the current BER of a communication channel n (n=channel number) in use and determines whether the BER is higher than a threshold value (step S101). The threshold value is a specific value that is predetermined to determine whether interference occurs or not. Since, in Bluetooth™, a communication channel is switched for each time slot, the current BER of the communication channel n can be obtained by adding and averaging BERs corresponding to some time slots using channel number n during a unit time period. If the current BER of channel number n is higher than the threshold value (YES in step S101), the control unit continues to monitor the BER of channel number n for a fixed time T1 (T1> unit time) (step S102) and determines whether the BER decreases to not higher than the threshold value within the fixed time T1 (step S103).

When the BER of channel number n does not decrease to not higher than the threshold value before the fixed time T1 elapses or the BER of channel number n continues to be higher than the threshold value for not shorter than the fixed time T1 (NO in step S103), the control unit determines the channel number n as a communication channel interfering with another wireless communication system and stops the use of the channel number n (step S104). Then, the node that determines the stop of use of the communication channel n notifies its destination nodes under communication of the stop of use of the communication channel n (step S105). The communication channel n is not therefore used any more.

Then, the channel number n is incremented by 1 (+1) or decremented by 1 (−1) (step S106) and the above process is performed again from step S101. Thus, the control unit checks the BER of all the communication channels in use and determines whether each of the communication channels is continuously used or released (suspended).

In Bluetooth™, the channel number n is incremented in ascending order such that the BER is determined in order from a lower-frequency communication channel. In IEEE 802.11b, it is decremented in descending order such that the BER is determined in order from a higher-frequency communication channel. Consequently, the problem that both IEEE 802.11b and Bluetooth™ stop using the same communication channel can be overcome, and communication channels respectively used by IEEE 802.11b and Bluetooth™ can effectively be optimized. Needless to say, the check of BER in IEEE 802.11b and that of Bluetooth™ can be performed in order opposite to each other, regardless of their types.

As described above, the communication of Bluetooth™ is conducted by a master-slave system. Therefore, the process of FIG. 11 has only to be performed only on the node side that serves as a master.

Communication Between Nodes of Bluetooth™

Figure 12:
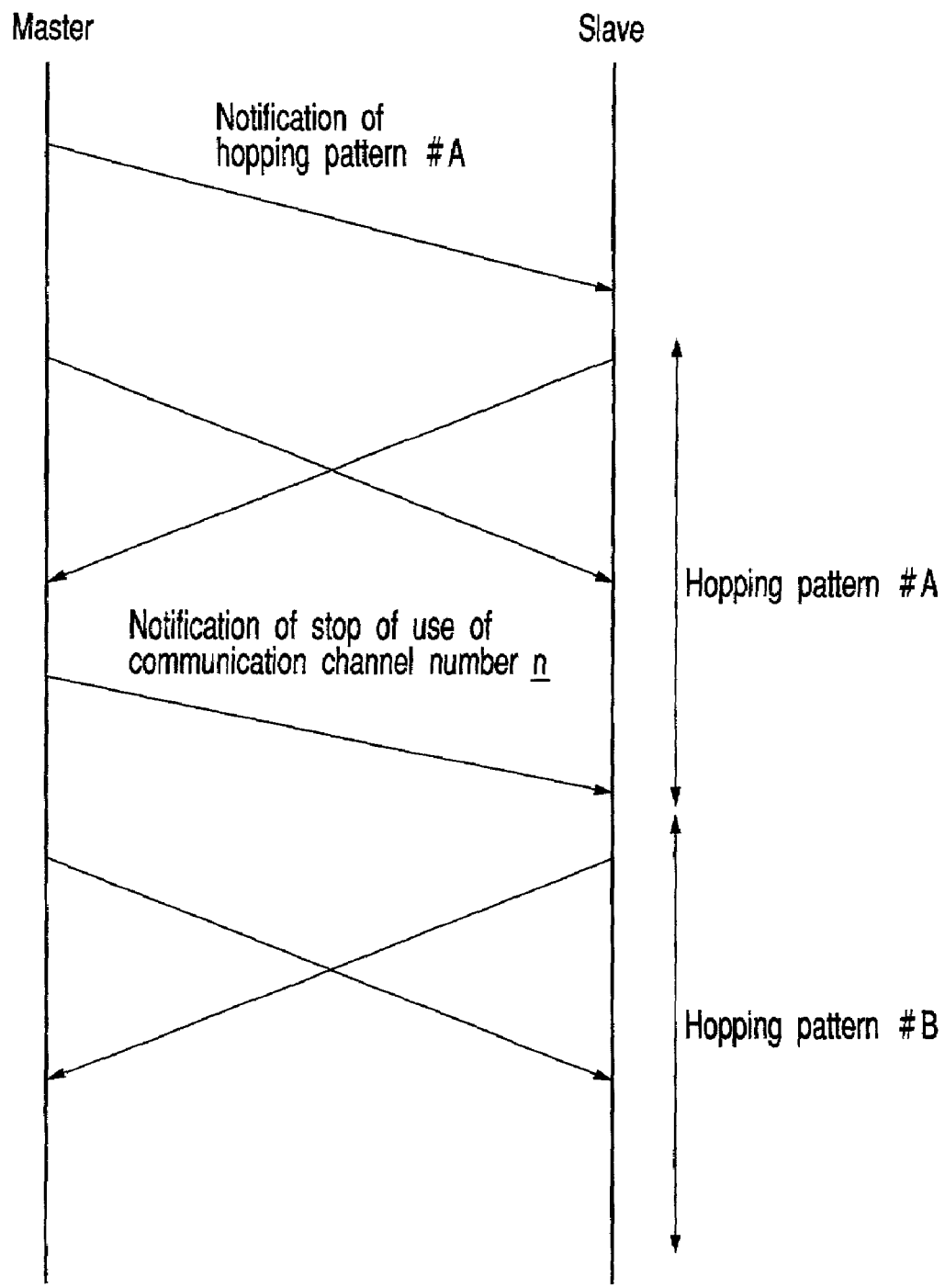
FIG. 12 is a diagram showing communication between nodes of Bluetooth™ used in the system shown in FIG. 1.

FIG. 12 shows communication between nodes of Bluetooth™.

First, a process for certifying apparatuses of a master and a slave is performed and the master notifies the slave of information (hopping pattern #A) indicating frequency hopping sequence used for communication between the master and slave. Then, wireless data communication between the master and slave is conducted by the spread spectrum-frequency hopping (SS-FH) using the hopping pattern #A.

If, in this state, IEEE 802.11b starts communication and the BER of communication channel n in use increases, the master notifies the slave of the stop of use of the communication channel n. After that, the hopping pattern #A is changed to a new one (hopping pattern #B) used for hopping between communication channels excluding the communication channel n. Needless to say, the master can explicitly notify the slave of the change to the new hopping pattern excluding the communication channel n.

Though the communication of IEEE 802.11b is not conducted by the master-slave system, the use of a communication channel for the actual data communication can depend upon the transfer of information between the nodes. Therefore, the node of IEEE 802.11b, which has detected the interference with Bluetooth™ first, has only to notify the node of destination IEEE 802.11b of the stop of use of an interference communication channel n, the number of a new communication channel, etc.

Figure 13:
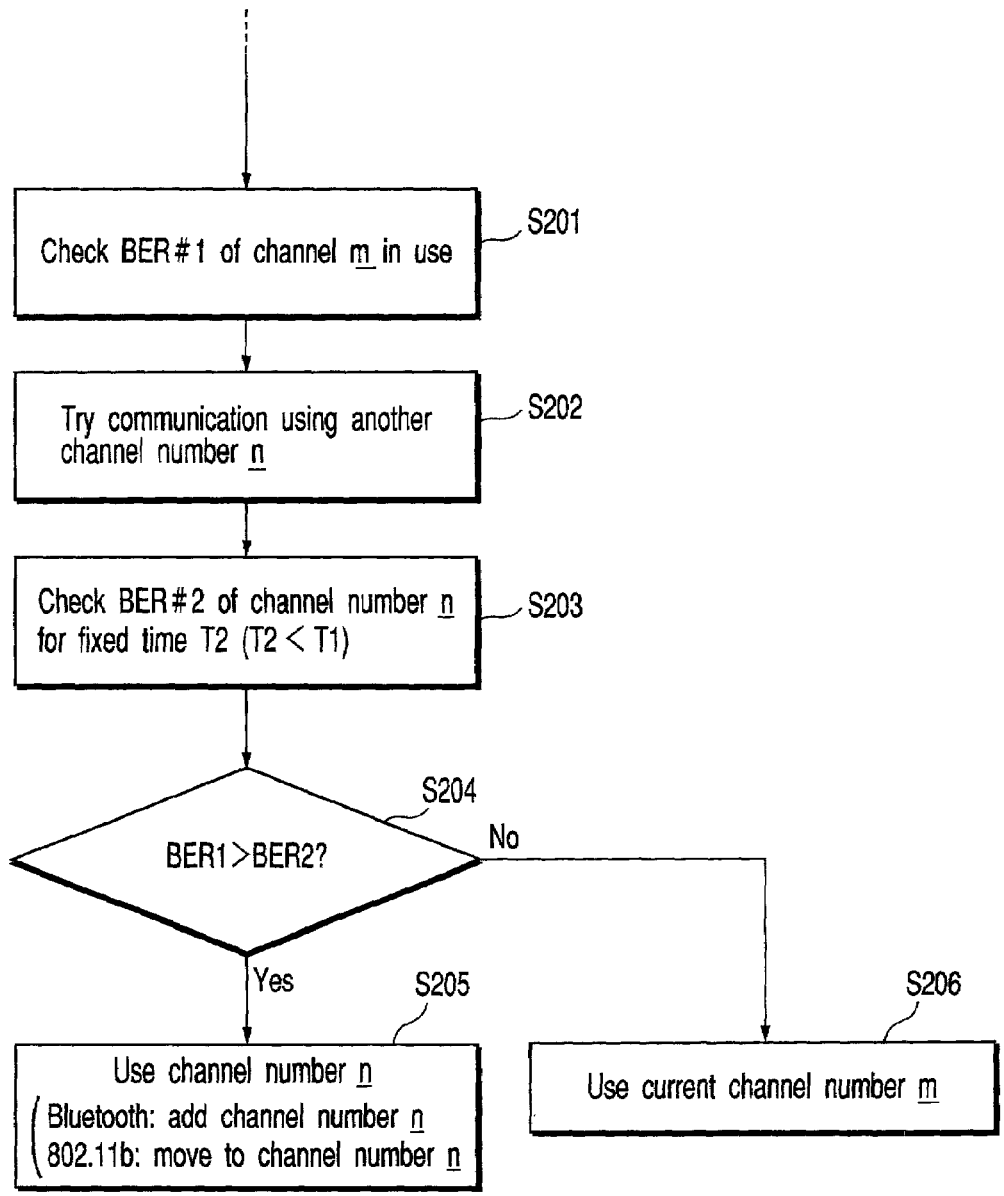
FIG. 13 is a flowchart explaining an operation of reusing a channel under suspension in the system shown in FIG. 1.

Referring to the flowchart of FIG. 13, a process of reusing a communication channel performed by the communication channel control units 111 and 121 will now be described.

First, the unit checks the current BER (BER#1) of a communication channel m (m=channel number) in use (step S201). Then, the unit tries to perform communication using a communication channel n under suspension for a fixed time T2 and checks the BER (BER#2) of the communication channel n (step S203). This step is performed as follows. In IEEE 802.11b, the unit forcibly and temporarily switches a communication channel for use to the communication channel n. In Bluetooth™, the unit temporarily adds the communication channel n to a target for hopping and then checks the BER (BER#2) of the communication channel n.

It is important that time T2 for trying performing communication using a communication channel n should be shorter than time T1 for detecting an interference channel as described with reference to FIG. 11. The reason is as follows. If a trial for communication using a communication channel n is made longer than time T1, there is a risk that another communication system that is conducting communication actually using the communication channel n will determine the communication channel n as an interference channel and stop using it.

When BER#1 is higher than BER#2 or when the radio environment of the communication channel n under suspension is better than that of the communication channel m in use (YES in step S204), the communication channel n does not interfere with another wireless communication system any more and thus the communication channel n is resumed (step S205). This step is performed as follows. In IEEE 802.11b, the unit changes a communication channel for use from the communication channel m to the communication channel n. In Bluetooth™, the unit adds the communication channel n to a target for hopping.

On the other hand, when the condition of step S204 is not satisfied (NO in step S204), the unit does not perform a process of a change to the communication channel n, addition of the communication channel n to a target for hopping, or the like, but maintains the current communication state using the communication channel m (step S206).

Another Example of Channel Select Control

Another example of channel select control performed by the communication channel control unit 111 of the Bluetooth™ module 11 will now be described with reference to the flowchart of FIG. 14. Considering that the frequency band of a communication channel used in Bluetooth™ is narrower than that in IEEE 802.11b, the unit 111 divides the 79 communication channels used in Bluetooth™ into some groups in accordance with allocation of frequencies of communication channels in IEEE 802.11b and determines whether each of the groups includes an interference channel.

As described above, the bandwidth of one communication channel in IEEE 802.11b is 22 MHz and that of one communication channel in Bluetooth™ is 1 MHz. Accordingly, the 79 communication channels of Bluetooth™ can be divided into a plurality of adjacent communication channel groups. In this case, the number of communication channels of each group is 22, and the bandwidth of each group is 22 MHz.

First, the control unit 111 checks the current BER of each of communication channels n (n=channel number) to n+α (α=21) (step S301). Then, the unit 111 calculates an average (or a summation) of the communication channels n to n+α as a BER of a group of communication channels n to n+α and determines whether the BER is higher than a predetermined threshold value (step S302). If the BER is higher than the threshold value (YES in step S302), the unit continues to monitor the BER for a fixed time T1 (step S303) and determines whether the BER decreases to not higher than the threshold value within fixed time T1 (step S304).

When the BER of a group of communication channels n to n+α does not decrease to not higher than the threshold value before the fixed time T1 elapses or when the BER continues to be higher than the threshold value for not shorter than the fixed time T1 (NO in step S304), the control unit determines the communication channels n to n+α as those interfering with another wireless communication system and stops using the communication channels (step S305). Then, the master node that determines the stop of use of the communication channels n to n+α notifies its destination slave nodes (step S306). The communication channels n to n+α are therefore omitted from targets for hopping and consequently frequency hopping is performed between communication channels excluding the communication channels n to n+α.

Then, the channel number n=n+α+1 or n=n−α−1 is updated (step S307) and the above process is performed again from step S301. Thus, the control unit checks the BER of all the communication channel groups and determines whether each of the communication channel groups is continuously used or released (suspended).

After use of a communication channel groups is suspended, the control unit 111 may execute a reusing process. In the reusing process, the control unit 111 checks the BER of the frequency channel group under suspension. That is, the control unit 111 temporarily adds the communication channels of the communication channel group under suspension to a target for hopping, and then checks the BER of the frequency channel group under suspension by trying performing the wireless communication. When the BER is lower than that of another frequency channel group in use, the control unit 111 resumes the frequency channel group under suspension to start the reuse of the communication channel group.

According to the above-described embodiment, an error rate of each of communication channels in use is detected for each of wireless communication systems and a communication channel to be used in each of the systems is detected based on the detection result. It is thus possible to overcome the problems that the effective communication speed is greatly decreased due to radio interference and the radio link is disconnected.

In the above embodiment of the present invention, only the IEEE 802.11b and Bluetooth™ have been described as wireless communication systems. However, the present invention can be applied to various wireless communication systems of the IEEE 802.11b standard and the Home RF. It can also be applied to the environment including three or more wireless communication systems. The BER can be replaced with an S/N ratio as an index for evaluating communication performance.

The functions of the communication channel control units 111 and 112 can be fulfilled by software that is executed on electronic equipment such as a personal computer mounted with the wireless LAN module 21.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method for performing wireless communication using a plurality of frequency channels defined in a specified frequency band, the method comprising:

detecting an error rate of each of a plurality of frequency channel groups into which the plurality of frequency channels are divided, each of the frequency channel groups including frequency channels falling within a frequency range corresponding to each of the frequency channel groups, the frequency range having a bandwidth which is decided based on a bandwidth of each frequency channel of another wireless communication that performs a wireless communication using the specified frequency band;

determining whether the detected error rate is higher than a specific threshold value; and suspending use of frequency channels of a frequency channel group whose error rate is higher than the specific threshold value.

2. The method according to claim 1, wherein said wireless communication is spread spectrum-frequency hopping communication which performs frequency hopping using the frequency channels.

3. The method according to claim 1, wherein said wireless communication is performed by a master-slave system, said detecting and said determining are performed by a master, and said suspending includes notifying a slave of a suspension of use the frequency channels of the frequency channel group whose error rate is determined to be higher than the specific threshold value by the master.

4. The method according to claim 1, wherein said wireless communication is spread spectrum-frequency hopping communication, and said suspending includes excluding the frequency channels of the frequency channel group whose error rate is determined to be higher than the specific threshold value, from a plurality of frequency channels targeted for frequency hopping.

5. A wireless communication apparatus for performing wireless communication using a plurality of frequency channels defined in a specified frequency band, the apparatus comprising:

a detecting unit configured to detect an error rate of each of a plurality of frequency channel groups into which the frequency channels are divided, each of the frequency channel groups including frequency channels falling within a frequency range corresponding to each of the frequency channel groups, the frequency range having a bandwidth which is decided based on a bandwidth of each frequency channel of another wireless communication that performs a wireless communication using the specified frequency band;

a determining unit configured to determine whether the detected error rate is higher than a specific threshold value; and a suspending unit configured to suspend use of frequency channels of a frequency channel group whose error rate is higher than the specific threshold value.

6. The wireless communication apparatus according to claim 5 wherein said wireless communication is spread spectrum-frequency hopping communication which performs frequency hopping using the frequency channels.

7. The wireless communication apparatus according to claim 5, wherein said wireless communication is spread spectrum-frequency hopping communication, and said suspending unit includes a unit which excludes the frequency channels of the frequency channel group whose error rate is determined to be higher than the specific threshold value, from a plurality of frequency channels targeted for frequency hopping.

* * * * *

UNITED STATES PATENT AND TRADEMARK OFFICE
CERTIFICATE OF CORRECTION

PATENT NO. : 7,006,451 B2
DATED : February 28, 2006
INVENTOR(S) : Kuwahara

It is certified that error appears in the above-identified patent and that said Letters Patent is hereby corrected as shown below:

Column 10,
Line 49, change "use the" to -- use of the --.

Column 11,
Line 13, change "claim 5" to -- claim 5, --.

Signed and Sealed this

Sixteenth Day of May, 2006

JON W. DUDAS
*Director of the United States Patent and Trademark Office*